United States Patent [19]

Foster

[11] Patent Number: 4,561,920

[45] Date of Patent: Dec. 31, 1985

[54] BIAXIALLY ORIENTED OXYGEN AND MOISTURE BARRIER FILM

[75] Inventor: Ronald H. Foster, Minooka, Ill.

[73] Assignee: Norchem, Inc. formerly Northern Petrochemical Company, Omaha, Nebr.

[21] Appl. No.: 578,073

[22] Filed: Feb. 8, 1984

[51] Int. Cl.$^4$ .............................................. B32B 31/00
[52] U.S. Cl. ........................ 156/244.11; 156/244.24; 428/35; 428/516; 428/518; 428/349
[58] Field of Search .................. 428/35, 516, 349; 156/244.11, 244.24

[56] References Cited

U.S. PATENT DOCUMENTS

| | | | |
|---|---|---|---|
| 3,882,259 | 5/1975 | Nohara et al. | 428/516 |
| 4,254,169 | 3/1981 | Schroeder | 428/35 |
| 4,407,897 | 10/1983 | Farrell et al. | 428/516 |
| 4,421,823 | 12/1983 | Theisen et al. | 428/349 |
| 4,457,960 | 7/1984 | Newsome | 428/35 |

FOREIGN PATENT DOCUMENTS 2019781 11/1979 United Kingdom ........... 156/244.24

*Primary Examiner*—Edith Buffalow
*Attorney, Agent, or Firm*—Donald F. Haas

[57] ABSTRACT

A biaxially oriented oxygen and moisture barrier film and a method of producing such a film which comprises co-extruding at least one polyolefin polyolefin layer, at least one layer of an ethylene vinyl alcohol copolymer with a melt flow rate of at least about 8 grams per 10 minutes, and an adhesive layer wherein the layers are combined into a composite sheet with the adhesive interposed between the polyolefin layer and ethylene vinyl alcohol copolymer layers. Next, the composite sheet is immediately cooled so that the crystallinity of the ethylene vinyl alcohol copolymer is no more than about 25 percent. Finally, the composite sheet is biaxially oriented in the longitudinal direction to a degree of about 2:1 to about 4:1 and in the transverse direction to a degree of about 3:1 to about 7:1.

14 Claims, No Drawings

BIAXIALLY ORIENTED OXYGEN AND MOISTURE BARRIER FILM

BACKGROUND OF THE INVENTION

The present invention relates to a method for producing a biaxially oriented oxygen and moisture barrier film which is comprised of a polyolefin layer and an ethylene vinyl alcohol copolymer barrier layer. More particularly, the invention relates to a simple continuous method whereby the two layers are combined by co-extrusion and biaxially oriented at the same time.

Ethylene vinyl alcohol copolymer resins offer excellent barrier properties with respect to such gases as oxygen, carbon dioxide and nitrogen. In addition, they are also effective barriers against odors and the loss of flavor. Such resins, hereinafter referred to as EVOH resins, are moisture sensitive and the barrier properties are reduced in the presence of high humidity. Polypropylene offers excellent barrier properties with respect to moisture together with good strength properties and a high use temperature. When EVOH resins are encapsulated by layers of polypropylene, they are protected from moisture and therefore retain their barrier characteristics.

The biaxial orientation of EVOH resins enhances their barrier properties as well as reduces their susceptibility to moisture. The biaxial orientation of polypropylene increases its stiffness and enhances both its optical and other physical properties such as tensile strength, tear strength, and other mechanical properties.

In the past, others have attempted to produce biaxially oriented composite structures containing both polypropylene and EVOH resins by first producing a polypropylene sheet and orienting the sheet in the longitudinal direction. Then a layer of EVOH resin was either laminated or extrusion coated onto the polypropylene and the composite was then oriented in the transverse direction. This method of production is costly and only results in the orientation of the EVOH resin in one direction, thus not achieving the full benefit of biaxial orientation.

U.S. Pat. No. 4,239,826, issued Dec. 16, 1980, discloses a multi-layer barrier film comprising a barrier layer of substantially pure ethylene vinyl alcohol copolymer adhered between adjacent adherent layers consisting essentially of a partially hydrolyzed vinyl acetate polymer or copolymer. A layer of another material such as polypropylene can overlie the partially hydrolyzed vinyl acetate layers. The patent discloses co-extrusion of the EVOH and the partially hydrolyzed vinyl acetate polymer to form the multi-layer structure and then subsequent co-extrusion of the overlying material onto this structure. The patent does not suggest that this construction could be biaxially oriented and is otherwise distinguishable from the present invention because the adhesive is different, it does not mention controlling crystallinity of the EVOH, the percent ethylene of the products mentioned is too low for flexibility for biaxially oriented film, and, even if this film was to be biaxially oriented, the operation would be a two-step operation whereas the operation of the present invention is a one-step operation.

SUMMARY OF THE INVENTION

The present invention relates to a method of producing a biaxially oriented oxygen and moisture barrier film which comprises first co-extruding at least one polyolefin layer of a polyolefin selected from the group consisting of polyethylene, polypropylene and copolymers of ethylene with other olefin monomers, at least one layer of an ethylene vinyl alcohol copolymer with a melt flow rate of at least about 8 grams per 10 minutes, and at least one adhesive layer wherein these layers are combined into a composite sheet with the adhesive interposed between the core layer and the EVOH. Next, the composite sheet is immediately cooled so that the crystallinity of the EVOH is no more than about 25%. Finally, the composite sheet is biaxially oriented in the longitudinal direction to a degree of about 2:1 to about 4:1 and in the transverse direction to a degree of about 3:1 to about 7:1. In a prefered embodiment of the invention, the ratio of the thickness of the adhesive to the thickness of the core layer is about 1:8 to about 1:15. The invention also relates to a biaxially oriented oxygen and moisture barrier film formed by the above method.

DETAILED DESCRIPTION OF THE INVENTION

The ethylene vinyl alcohol (EVOH) copolymers used in the present invention are the saponified or hydrolyzed product of an ethylene-vinyl acetate copolymer having, generally, an ethylene content of 25 to 75 mole percent. It is highly preferred that the percent ethylene in the EVOH be at least 45 percent so that the EVOH is flexible enough to be stretched during the orientation process. The degree of hydrolysis should reach at least 96 percent, preferably at least 99 percent. It is highly preferred that the degree of hydrolysis be greater than 96 percent because below that the barrier properties are less than optimum. It is extremely important to the performance of the present invention that the melt flow rate of the EVOH be at least 8 grams per 10 minutes at 190° C. and a load of 2,160 grams. If the melt flow rate is less than 8 grams per 10 minutes then the viscosities of the EVOH, adhesive, and core layer cannot be matched. It is important to match the viscosities of these materials to avoid interfacial instability which causes waviness of the melt and uneven distribution of the layers, otherwise known as melt fracture. The viscosity of these materials is most easily and effectively matched by monitoring the melt flow rate of the materials. At EVOH melt flow rates below 8 grams per 10 minutes, melt fracture occurs. It does not occur if the melt flow rate is higher.

The polyolefin layer used in the present invention can be of a polyolefin selected from the group consisting of polyethylene, including low density polyethylene, high density polyethylene, and linear low density polyethylene, polypropylene, and copolymers of ethylene with other olefins. The preferred polymers for use as the polyolefin layer are polypropylene and ethylene propylene copolymers containing predominately propylene. The melt flow rate of the polyolefin layer must not be so low that it is too stiff and thus unorientable. For propylene ethylene copolymers, it is preferred that the melt flow rate be from about 2.5 to about 6.0 grams per 10 minutes at 230° C. and a load of 2,160 grams. For polypropylene, it is preferred that the melt flow rate be from about 2.5 to about 4.5. In this range, the viscosities of the copolymer and the polypropylene are most compatible with EVOH and the adhesive. Also, in this range, orientation of the copolymer or the polypropylene results in the best properties.

The adhesive used in the present invention should be selected from the group consisting of maleic anhydride-modified polymers and polymers similar thereto. Such polymers are effective adhesives for adhering the polyolefin layer to the EVOH layer and also a viscosity similar to the above-described EVOH and polyolefin layers. The preferred adhesives for use in this invention are maleic anhydride-modified polyolefins. Examples of such polymers are the Admer® QF-500 series manufactured by Mitsui Petrochemical Company, the Modic® P-300 series manufactured by Mistubishi Petrochemical Company, and Plexar® adhesives manufactured by Chemplex.

The process for the manufacture of a biaxially oriented three or more layer composite barrier sheet consists of four distinct steps which together comprise a relatively simple continuous operation. First, the composite sheet, consisting of polypropylene, for example, an adhesive layer, and an EVOH barrier layer, is formed by co-extrusion of the above components. One way of accomplishing this is to use three extruders and have the materials fed into a combining feed block. Within the feed block, the materials are layered to form the multi-layer melt stream wherein the adhesive is interposed between the polypropylene and the EVOH. The melt stream is fed into a slot cast sheet die or other type of die to form the multi-layer sheet. As the sheet exits the die, it is immediately cooled by use of a cooling drum or a water bath to a temperature satisfactory to maintain a 25 percent crystallinity rate in the EVOH material.

The 25 percent crystallinity rate can be obtained by maintaining the temperature of the cooling medium at 30° to 40° C. If the crystallinity of the EVOH is higher than 25 percent at this point in the process, the EVOH becomes too stiff to stretch properly in the orientation process and it will merely break apart. It is preferable that the crystallinity of the EVOH should be at least about 20 percent in order to obtain sufficient crystallinity in the final product.

Immediately after cooling, the composite sheet is fed into an apparatus adapted for biaxial orientation of plastic material. Any such apparatus can be used in the present invention. One example would be to feed the composite sheet into a set of differential speed heated rollers to stretch the sheet in the longitudinal direction to a degree of about 2:1 to about 4:1. Next, the sheet can be fed to a tenter frame where it is stretched in the transverse direction to a degree of about 3:1 to about 7:1.

If the degree of longitudinal orientation is less than about 2:1, then uneven orientation occurs, and if it is more than about 4:1, then fracture of the sheet occurs. If the degree of orientation in the transverse direction is less than about 3:1, then uneven orientation occurs, and more than about 7:1, then fracture of the sheet occurs. If polypropylene is used as the polyolefin layer, then it is preferred that the machine direction orientation rollers be at a temperature of from about 130° to about 140° C. and that the tenter frame for transverse orientation be at about 150° to about 160° C. If propylene ethylene copolymers are used in the polyolefin layer, then the machine direction roller temperature should be about 125° to about 130° C. and the tenter frame temperature should be about 130° to about 135° C.

After the sheet has been biaxially oriented, it is subjected to a heat setting treatment which allows the EVOH to crystallize. The crystallizing of the EVOH imparts high barrier properties to the EVOH layer and thus to the composite film. Any known heat setting method can be used, but one example of such a method is to pass the biaxially stretched sheet over a series of heated rolls.

It is highly preferred that the ratio of the thickness of the adhesive to the thickness of the polyolefin layer be about 1:8 to about 1:15. If the ratio is less than about 1:8, then poor adhesion between the EVOH and adhesive occurs, preventing satisfactory orientation. If the ratio is more than about 1:15, then uneven flow distribution of the adhesive occurs and the adhesion is poor.

EXAMPLES

The materials used in all of the following examples are:

Polypropylene:
 Homopolymer - Solvay Eltex HP405, 3.8 melt flow rate
 Copolymer - Solvay KS400, 5.7 melt flow rate (4% ethylene, 96% propylene)

Ethylene Vinyl Alcohol Copolymer:
 Eval® "F" Grade resin made by Kuraray Co., Ltd. - 1.5 melt index
 EVAL® "E" Grade resin made by Kuraray Co., Ltd. - 5.6 melt index
 EVAL® "G" Grade resin made by Kuraray Co., Ltd. - 15.1 melt index Adhesive:
 Admer® QF500B - 4.2 melt flow rate (a maleic anyhdride-modified polypropylene)

All of the following examples attempted to produce a biaxially oriented five layer composite barrier sheet of ABCBA construction according to the same general process consisting of the following four distinct steps:

1. A five layer composite sheet was co-extruded by the use of three extruders. The sheet consisted of a polyolefin (A layer), an adhesive layer (B layer), an EVOH layer (C layer), another adhesive layer (B layer), and another polyolefin layer (A layer). The materials were fed into a combining feed block where they were layered to form the five layer melt stream of ABCBA construction. This melt stream was then fed into a slot cast sheet die to form the five layer sheet. As the sheet exited the die, it was immediately cooled by the use of a cooling drum, or in some cases a water bath, to a temperature which maintained a 25 percent crystallinity rate in the EVOH material.

2. Immediately after cooling, the composite sheet was fed into a set of differential speed heated rolls (MDO) which stretched the sheet in the longitudinal direction.

3. After exiting the differential speed heated rollers (MDO), the sheet was fed to a tenter frame. In the tenter frame, the sheet was stretched in the transverse direction.

4. After the sheet was biaxially stretched, it was passed over a series of heated rolls which imparted a heat setting to the composite sheet and allowed the EVOH layer to crystallize. The crystallizing of the EVOH imparted high barrier properties to the composite sheet.

The follwing examples specify which materials were used. The orientation of the extruders was as follows in all cases:

Extruder #1: Always polypropylene
Extruder #2: Always EVOH
Extruder #3: Always Adhesive

EXAMPLES

In all cases in the following examples, the crystallinity of the EVOH material as it exited the die was maintained below 25%. The crystallinity ranged from 18 to 22% in the examples. The method of determination of the percent crystallinity is based upon the linear relationship between the percent crystallinity and the density of the film. The percent crystallinity is empirically determined by measuring the density of the total amorphous portion and the total crystalline portion of a particular grade of EVOH film and using this information in the formula set out below.

The density is first measured by any acceptable method such as ASTM D1505-68. Next, the total amorphous and total crystalline portions of the EVOH are separated and their densities measured according to the same procedure. For the three grades of EVOH used in the following examples, the densitites of the amorphous and crystalline portions are as follows:

TABLE

| Grade | Density of Amorphous Portion | Density of Crystalline Portion |
| --- | --- | --- |
| E Grade | 1.110 | 1.148 |
| F Grade | 1.163 | 1.200 |
| G Grade | 1.094 | 1.130 |

The above densities are considered constants because they do not change. The film density will change depending upon the degree of the quenching treatment. In the following formula FD is the film density, AD is the amophous density constant, and CD is the crystalline density constant. The percent crystallinity of a film is determined by:

$$\% \text{ Crystallinity} = \frac{FD - AD}{CD - AD} \times 100$$

Thus, it is clear that the percent crystalline increases linearly as the density of the film increases. The crystallinity of the film can be controlled by controlling the density of the film. This is what takes place in the quenching step.

EXAMPLE I

| Materials: | Homopolypropylene |
| --- | --- |
| | EVOH "E" Grade |
| | Adhesive |
| Extruder #1: | Melt Temp. 260° C., RPM (revolutions per minute) 117.5 |
| Extruder #2: | Melt Temp. 190° C., RPM 25 |
| Extruder #3: | Melt Temp. 185° C., RPM 29.5 |
| Feedblock Temperature: | 200° C. |
| MDO Rolls Temperature: | 120° C. |
| Tenter Temperature: | 165° C. |
| MDO Orientation: | 2.0:1 |
| Transverse Orientation: | 3.0:1 |

The stretched film exhibited a fishnet effect due to the fibrillation of the EVOH layer.

EXAMPLE II

Using the same conditions and materials as in Example I, except that the RPM of Extruder #2 (EVOH) was reduced to 15 and the machine direction (MD) orientation was increased to 3.0:1, the same fishnet appearance was evident.

EXA,MPLE III

Starting with the conditions and materials in Example II, the degree of MD orientation was varied while the transverse direction (TD) orientation was held constant. As the MD orientation was decreased from 3.0:1 to 2.0:1, the fishnet appearance decreased. At a 1.0:1, MD orientation and a 3.0:1 TD orientation, the fishnet appearance disappeared. This, however, only resulted in a uniaxially (transverse direction) oriented sheet which exhibit non-uniform thickness and poor optical properties.

EXAMPLE IV

In observing the samples from Example I through III, it was noted that the reason for the fibrillation of the EVOH layer might have been due to the lack of adhesion between the PP and EVOH layers. To investigate this, the conditions and materials used in Example I were selected as a base point. The melt temperature of the adhesive layer was increased in increments of 5° C. until the melt temperature was the same as that of the polypropylene. It was noted that the adhesion became better as the temperature was increased. However, fibrillation of the EVOH layer was still present.

EXAMPLE V

| Materials: | Copolymer Polypropylene |
| --- | --- |
| | EVOH "E" Grade |
| | Adhesive |
| Extruder #1: | Melt Temp. 240° C., RPM 95 |
| Extruder #2: | Melt Temp. 190° C., RPM 15 |
| Extruder #3: | Melt Temp. 260° C., RPM 50 |
| Feedblock Temperature: | 180° C. |
| MDO Rolls Temperature: | 120° C. |
| Tenter Temperature: | 165° C. |
| MDO Orientation: | 2.4:1 |
| Transverse Orientation: | 4.0:1 |

The initial trials exhibited minor fibrillation of the EVOH layer and uneven orientation of the polypropylene layer. The RPM of the EVOH layer were increased to 30 to increase the thickness. Fibrillation still resulted. The thicknesses of the various layers were increased in increments of 0.5 times the original up to two times the original. There was no appreciable effect on fibrillation. Orientation temperatures were varied until a limit on the low end was reached where transverse stretching would not occur and on the high end until the polypropylene would stick to the tenter frame clips. Fibrillation still was evident. The conclusion reached from the first five examples was that EVOH "E" grade could not be satisfactorily biaxially oriented.

EXAMPLE VI

| Materials: | Copolymer Polypropylene |
| --- | --- |
| | EVOH "G" Grade |
| | Adhesive |
| Extruder #1: | Melt Temp. 240° C., RPM 95 |
| Extruder #2: | Melt Temp. 185° C., RPM 20 |
| Extruder #3: | Melt Temp. 250° C., RPM 75 |
| Feedblock Temperature: | 185° C. |
| MDO Rolls Temperature: | 120° C. |
| Tenter Temperature: | 140° C. |
| MDO Orientation: | 2.8:1 |
| Transverse Orientation: | 3.0:1 |

The above conditions were the starting conditions. The composite sheet exhibited extreme melt fracture upon exit from the die. This melt fracture was occuring in the EVOH layer and was due to the difference in viscosities of the various components. The difference in viscosities in turn affected the flow properites through the feedblock and die. Various combinations of heat and speed were investigated until the following parameters were reached which in turn resulted in a satisfactory biaxially oriented composite sheet.

| | |
|---|---|
| Extruder #1: | Melt Temp. 240° C., RPM 95 |
| Extruder #2: | Melt Temp. 200° C., RPM 20 |
| Extruder #3: | Melt Temp. 250° C., RPM 50 |
| Feedblock Temperature: | 200° C. |
| MDO Rolls Temperature: | 129° C. |
| Tenter Temperature: | 130° C. |
| MDO Orientation: | 2.0:1 |
| Transverse Orientation: | 3.0:1 |

EXAMPLE VII

| | |
|---|---|
| Materials: | Homopolypropylene |
| | EVOH "G"Grade |
| | Adhesive |
| Extruder #1: | Melt Temp. 260° C., RPM 115 |
| Extruder #2: | Melt Temp. 190° C., RPM 20 |
| Extruder #3: | Melt Temp. 250° C., RPM 80 |
| Feedblock Temperature: | 200° C. |
| MDO Rolls Temperature: | 140° C. |
| Tenter Temperature: | 150° C. |
| MDO Orientation: | 4.4:1 |
| Transverse Orientation: | 3.0:1 |

Again, the above conditions were the starting conditions. Although the sheet going into the tenter frame looked good, holes were torn in the sheet during transverse orientation. This indicates either the sheet is too cold or the orientation is too high. Various orientation ratios were investigated from MDO 2.0:1 to 4.0:1 and transverse from 3.0:1 to 5.4:1. It was noted that as the MDO ratio was increased from 2.0:1, the EVOH started to fibrillate. At 4.0:1 MDO ratio, the EVOH was totally fibrillated. Increasing the transverse ratio and holding the MDO at 2.0:1 did not have the same effect.

EXAMPLE VIII

In an attempt to match viscosities and flow rates of the various materials, the following changes were made in the conditions used in Example VII.

| | |
|---|---|
| Extruder #1: | RPM 85 |
| Extruder #2: | RPM 25 |
| Extruder #3: | RPM 25 |
| Tenter Temperature: | 160° C. |
| MDO Orientation: | 3.0:1 |
| Transverse Orientation: | 4.2:1 |

Using these conditions, an excellent biaxially oriented sheet was produced. The properties of this sheet are shown in the Table. Orientation ranges from MDO 2.0:1 to MDO 4.0:1 and transverse 3.0:1 to 7.0:1 were studied and satisfactory sheets were produced. The properties of two different films made hereunder are shown in the Table.

EXAMPLE IX

To further invesitage the effects of parameters on the ability to orient the sheet, the following was studied:

To determine the effect of Adhesive thickness: The PP RPM was held constant. The adhesive RPM was decreased in 5 RPM increments to 25 RPM. At 25 RPM, fibrillation occurs.

To determine the effect of PP thickness: The adhesive RPM was held constant. The PP RPM was decreased to 70 RPM. Uneven flow distribution occurred. The adhesive RPM was set at 25 RPM. The PP RPM was 70. Uneven flow distribution occurred.

EXAMPLE X

| | |
|---|---|
| Materials: | Homopolypropylene |
| | EVOH "F" grade |
| | Adhesive |
| Extruder #1: | Melt Temp. 260° C., RPM 85 |
| Extruder #2: | Melt Temp. 210° C., RPM 25 |
| Extruder #3: | Melt Temp. 250° C., RPM 50 |
| Feedblock Temperature: | 210° C. |
| MDO Rolls Temperature: | 140° C. |
| Tenter Temperature: | 160° C. |

MDO orientation from 2.0:1 to 3.0:1 and transverse orientation at 3.0:1 were attempted and fibrillated film resulted. Changes in Extruder #1 RPM to 80 and Extruder #2 RPM to 40 did not have any effect. Various temperature conditions did not have any effect. The conclusion was the EVOH "F" grade could not be satisfactorily biaxially oriented.

Final Thickness

This is a determination of the thickness of even layer in the five layer composite sheet. The film was characterized by both light microscopy and scanning electron microscopy (SEM) techniques. For the SEM technique, the samples were notched and fracture. Light microscopy samples were imbedded in LDPE and microtomed in thin sections. By using the thickness of the individual layers, comparisons can be made between the properties of oriented and unoriented films of the same thickness.

$O_2$ Transmission

It is known that the presence of oxygen causes foods to degrade. The $O_2$ transmission of structure is a measure of its barrier to the penetration of oxygen to the materials packaged with the film structure. This determination was carried out according to ASTM Standard D3985-81.

MVTR

The Moisture Vapor Transmission is an indication of the amount of $H_2O$ that will permeate to the packaged goods or conversely the amount of moisture that can escape from a packaged liquid product. Also the barrier properties of a barrier material are deteriorated by the presence of moisture. Therefore, it is desirable to prevent as much moisture as possible from reaching the barrier layer. This test was carried out according to ASTM Test Methods E398-70.

Ultimate Tensile

The ultimate tensile strength is a measure of the strength of the material. It is the amount of force per square inch of material required to pull it apart. This test was carried out according to ASTM D-882-73, Method A.

Secant Modulus

The secant modulus is a measure of the stiffness of the material. A stiff material is required to provide good machineability and handling in subsequent packaging operations, and also to provide a crisp feel to packaged products. This method was carried out according to AS,M D-618.

TABLE

| Example | Final Thickness | $O_2$ Transmission $cc/m^2/24$ hrs. @ 20° C. 0% RH | MVTR $g/m^2$ | Ultimate Tensile MD MPa | Ultimate Tensile TD Mpa | Secant Modulus MD Mpa | Secant Modulus TD Mpa |
|---|---|---|---|---|---|---|---|
| Homopolymer PP | 12 | 12 | 3.0 | 80 | 250 | 1888 | 5148 |
| Adhesive | 1.3 | | | | | | |
| EVOH G | 3.5 | | | | | | |
| Adhesive | 1.3 | | | | | | |
| Homopolymer PP | 12 | | | | | | |
| Homopolymer PP | 13 | 13 | 3.3 | 91 | 238 | 1575 | 4089 |
| Adhesive | 1 | | | | | | |
| EVOH G | 2 | | | | | | |
| Adhesive | 1 | | | | | | |
| Homopolymer PP | 13 | | | | | | |

I claim:

1. A method of producing a biaxially oriented oxygen and moisture barrier film which comprises:
   (a) co-extruding
      (1) at least one layer of a polyolefin material selected from the group consisting of polyethylene, polypropylene, and copolymers of ethylene with other olefins,
      (2) at least one layer of an ethylene vinyl alcohol copolymer with a melt flow rate of at least about 8 grams per 10 minutes, and
      (3) at least one adhesive layer
   and combining these layers into a composite sheet wherein the adhesive is interposed between the polyolefin layer and the ethylene vinyl alcohol copolymer layers,
   (b) immediately cooling the composite sheet so that the crystallinity of the ethylene vinyl alcohol copolymer is no more than about 25 percent, and
   (c) biaxially orienting the composite sheet in the longitudinal direction to a degree of about 2:1 to about 4:1 and in the transverse direction to a degree of about 3:1 to about 7:1.

2. The method of claim 1 wherein the ratio of the thickness of the adhesive to the thickness of the polyolefin layer is about 1:8 to about 1:15.

3. The method of claim 1 wherein the coposite sheet is cooled in a cooling medium at a temperature of 30° to 40° C. in step (b).

4. The method of claim 1 wherein the longitudinal orientation is carried out at a temperature of from about 130° to about 140° C. and the transverse orientation is carried out at a temperature of from about 150° to 160° C. and the polyolefin layer is comprised of polypropylene.

5. The method of claim 1 wherein the longitudinal orientation is carried out a temperature of from about 125° to about 130° C. and the transverse orientation is carried out at a temperature of from about 130° to 135° C. and the polyolefin layer is comprised of a copolymer of propylene and ethylene.

6. The method of claim 1 wherein the polyolefin layer is selected from the group consisting of polypropylene and copolymers of propylene and ethylene.

7. The method of claim 1 wherein a five layer film is produced comprising two outer polyolefin layers, an inner ethylene vinyl alcohol copolymer layer, and two adhesive layers disposed between the polyolefin layers and the ethylene vinyl alcohol copolymer layer.

8. A biaxially oriented oxygen and moisture barrier film formed by:
   (a) co-extruding
      (1) at least one layer of a polyolefin material selected from the group consisting of polyethylene, polypropylene, and copolymers of ethylene with other olefins,
      (2) at least one layer of an ethylene vinyl alcohol copolymer with a melt flow rate of at least about 8 grams per 10 minutes, and
      (3) an adhesive layer
   and combining these layers into a composite sheet wherein the adhesive is interposed between the polyolefin layer and the ethylene vinyl alcohol copolymer layers,
   (b) immediately cooling the composite sheet so that the crystallinity of the ethylene vinyl alcohol copolymer is no more than about 25 percent, and
   (c) biaxially orienting the composite sheet in the longitudinal direction to a degree of about 2:1 to about 4:1 and in the transverse direction to a degree of about 3:1 to about 7:1.

9. The film of claim 8 wherein the ratio of the thickness of the adhesive to the thickness of the polyolefin layer is about 1:8 to about 1:15.

10. The film of claim 8 wherein there are five layers which are comprised of two outer polyolefin layers, an inner ethylene vinyl alcohol copolymer layer, and two adhesive layers disposed between the polyolefin layers and the ethylene vinyl alcohol copolymer layer.

11. The film of claim 8 wherein the polyolefin layer is selected from the group consisting of polypropylene and copolymers of propylene and ethylene.

12. The film of claim 8 wherein the composite sheet is cooled in a cooling medium at a temperature of 30° to 40° C. in step (b).

13. The film of claim 8 wherein the longitudinal orientation is carried out at a temperature of from about 130° to about 14° C. and the transverse orientation is carried out at at temperature of from about 150° to 160° C. when polypropylene is the core layer.

14. The film of claim 8 wherein the longitudinal orientation is carred out at a temperature of from about 125° to about 130° C. and the transverse orientation is carried out at a temperature of from about 130° to about 135° C. when the core layer is a copolymer of propylene and ethylene.

* * * * *